US008526132B2

(12) United States Patent
Albrecht et al.

(10) Patent No.: US 8,526,132 B2
(45) Date of Patent: Sep. 3, 2013

(54) SERVO PATTERNING COMPATIBLE WITH PLANARIZATION OF PATTERNED MAGNETIC DISKS

(75) Inventors: Thomas R. Albrecht, San Jose, CA (US); Masahito Kobayashi, Ushiku (JP); Keishi Takahashi, Fujisawa (JP); Kei Yasuna, Fujisawa (JP)

(73) Assignee: HGST Netherlands, B.V., Amsterdam (NL)

( * ) Notice: Subject to any disclaimer, the term of this patent is extended or adjusted under 35 U.S.C. 154(b) by 24 days.

(21) Appl. No.: 12/699,581

(22) Filed: Feb. 3, 2010

(65) Prior Publication Data
US 2011/0188149 A1    Aug. 4, 2011

(51) Int. Cl.
*G11B 5/09* (2006.01)
*G11B 5/596* (2006.01)
*G11B 21/02* (2006.01)

(52) U.S. Cl.
USPC .............................. 360/48; 360/75; 360/77.08

(58) Field of Classification Search
None
See application file for complete search history.

(56) References Cited

U.S. PATENT DOCUMENTS

| | | | |
|---|---|---|---|
| 5,541,784 A | 7/1996 | Cribbs et al. | |
| 5,766,718 A | 6/1998 | Matsuda et al. | |
| 6,490,111 B1 * | 12/2002 | Sacks | 360/53 |
| 6,643,082 B1 | 11/2003 | Belser | |
| 6,680,079 B1 | 1/2004 | Stirniman | |
| 6,753,043 B1 | 6/2004 | Kuo et al. | |
| 6,821,627 B2 | 11/2004 | Stirniman et al. | |
| 7,262,932 B2 | 8/2007 | Asakura | |
| 7,417,826 B2 | 8/2008 | Hattori et al. | |
| 2005/0013971 A1 | 1/2005 | Nam | |
| 2006/0012903 A1 * | 1/2006 | Asakura et al. | 360/48 |
| 2006/0203386 A1 | 9/2006 | Soeno | |
| 2006/0269495 A1 | 11/2006 | Popp et al. | |
| 2006/0275692 A1 | 12/2006 | Okawa | |
| 2007/0031706 A1 | 2/2007 | Okawa | |
| 2007/0224339 A1 | 9/2007 | Kamata | |
| 2008/0170234 A1 | 7/2008 | Kim | |
| 2008/0171234 A1 | 7/2008 | Imamura | |
| 2008/0186616 A1 | 8/2008 | Matsuura | |
| 2008/0239906 A1 | 10/2008 | Akagi et al. | |
| 2009/0195915 A1 * | 8/2009 | Shin et al. | 360/77.05 |
| 2010/0067141 A1 * | 3/2010 | Ishibashi et al. | 360/75 |
| 2011/0051286 A1 * | 3/2011 | Pokharel et al. | 360/131 |

FOREIGN PATENT DOCUMENTS

JP    2006031853    2/2006

* cited by examiner

*Primary Examiner* — Andrew L Sniezek
(74) *Attorney, Agent, or Firm* — Duft Bornsen & Fettig, LLP

(57) ABSTRACT

Embodiments herein illustrate patterned servo data that allows the patterned disk to be planarized with a relatively simple planarization process. A magnetic disk, in this regard, includes a data region having a plurality of tracks. The magnetic disk also includes a plurality of servo bursts patterned in the magnetic disk at a plurality of locations in each track. The servo bursts are operable to direct a controller to center a write head over a track in the data region and write a track identification. The servo bursts include magnetic lands and nonmagnetic grooves. The magnetic lands of the servo burst are generally configured with a uniform polarity of magnetization and a first uniform width. The nonmagnetic grooves are configured with a second uniform width.

20 Claims, 7 Drawing Sheets

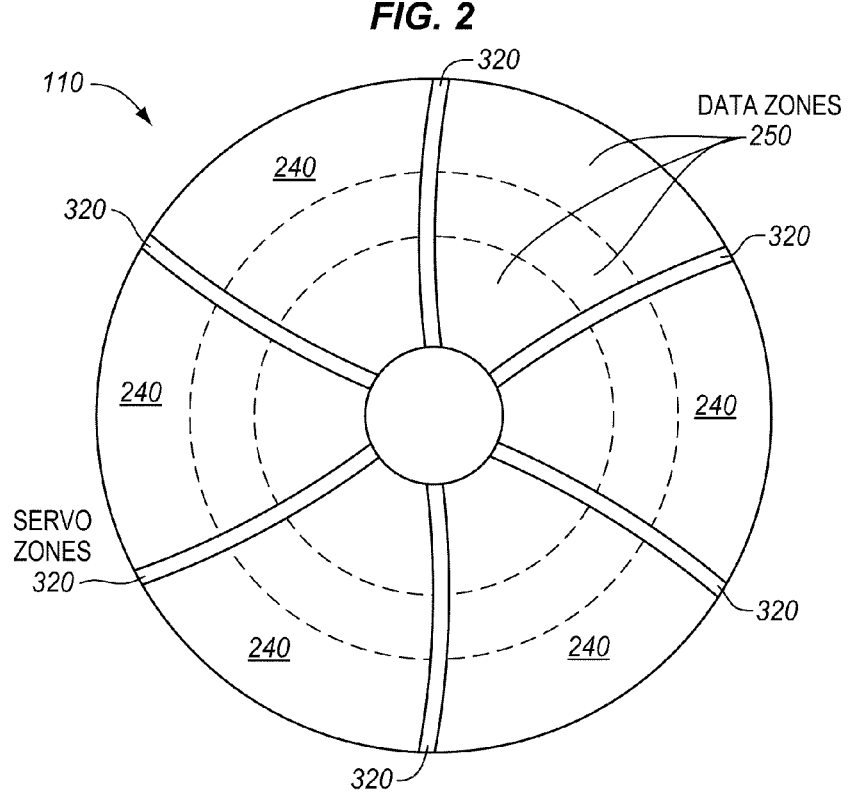
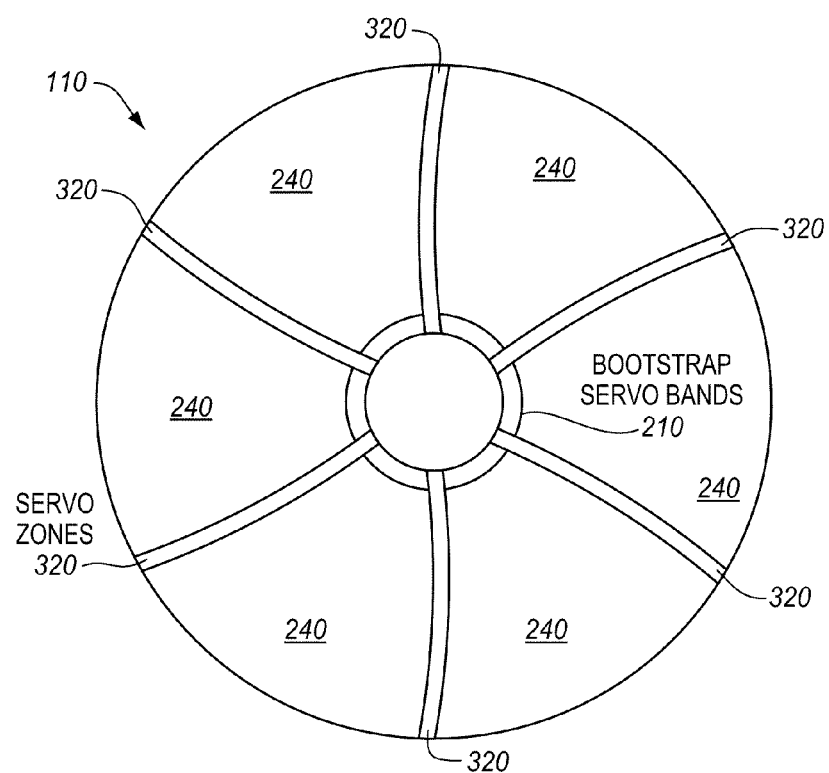

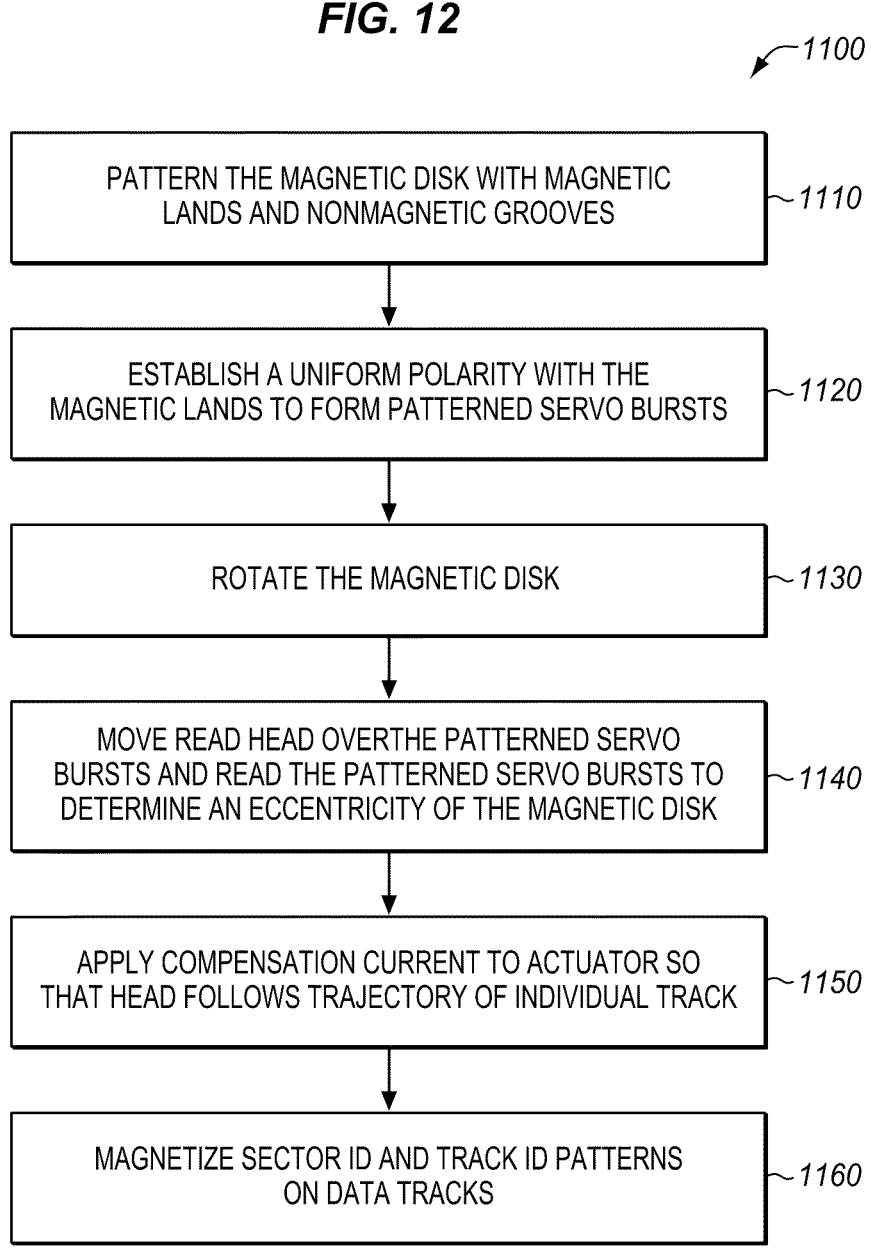

SERVO PATTERNING COMPATIBLE WITH PLANARIZATION OF PATTERNED MAGNETIC DISKS

BACKGROUND

1. Field of the Invention

The invention relates to the field of disk drive systems and, in particular, to a magnetic disk having patterned servo regions that assist in aligning a slider with data on the magnetic disk.

2. Statement of the Problem

Many computing systems use magnetic disk drive systems for mass storage of information. Magnetic disk drive systems typically include one or more sliders that include read and write heads. An actuator/suspension arm holds the slider above a magnetic disk. When the magnetic disk rotates, an air flow generated by the rotation of the magnetic disk causes an air bearing surface (ABS) of the slider to fly at a particular height above the magnetic disk. The height at which the slider flies depends on the shape of the ABS. As the slider flies on the air bearing, a voice coil motor (VCM) moves the actuator/suspension arm to position the read head and the write head over selected tracks of the magnetic disk.

The magnetic disk includes data sectors and servo sectors. The servo sectors include servo data that is used to provide sector information, timing information, positioning information, etc. For example, the servo data may include a sector ID, a track ID, and a servo burst. The sector ID is a field in the servo sector that contains a binary code identifying the sector. Servo sectors are generally labeled sequentially around a track (e.g., from sector #1 to sector #250 if the track has 250 servo sectors). By reading the track ID, the read head can determine what track it is over. A servo burst is a field in the servo sector that contains a specially designed pattern, which, when read by the read head, provides information about the position of the read head relative to the center of a specific track. By reading the servo burst, the controller can determine how far from the center of the track that the read head is. These two pieces of information are used by the controller to determine where the read head, or more specifically the slider, is on the disk. By reading the sector ID, the controller determines which part of the revolution the read head is over. As the magnetic disk makes a revolution, the read head passes over servo bursts and servo sectors. This servo data is fed back to a control system via a read signal that is used to generate a timing signal, a position signal (e.g., a quadrature signal), etc. The timing signal is used to control the VCM and the rotational speed of the magnetic disk. The position signal is used for centering the read head and write head over the center of a track (i.e., to keep the heads aligned with the data). This servo data is provided to a control system via a read signal and is used to generate a timing signal for spindle speed control and a position signal for positioning the head.

Servo patterns include pattern elements that occupy a relatively large lateral spatial extent of the magnetic disk, both down track and cross track, as compared to the size of a data bit on the disk. For example, in a conventional magnetic disk, two magnetizations of polarization are used for recording the servo patterns. The servo headers generally have large areas of uniform magnetization of polarization. Each region may be much larger when compared to a single data bit on the disk.

Patterned magnetic disks have emerged recently to enhance the recording density by providing better track isolation or bit isolation. For example, nano scale nonmagnetic grooves may be patterned in a magnetic disk by removing the magnetic material leaving behind "lands" of magnetic material. By patterning grooves in the magnetic disk, tracks can be more clearly distinguished and thus made narrower to increase the areal density of data on the magnetic disk. Two forms of patterned magnetic disks exist: Discrete Track Media (DTM) and Bit Patterned Media (BPM). In BPM, individual bits may be patterned via cross grooves of non-magnetic material (e.g., track grooves and crossing bit grooves that leave behind "islands" of magnetic material). In each of these, servo patterns may be generally created as part of the overall disk patterning process. In DTM, discrete tracks are patterned into the magnetic disk. One common approach to creating servo patterns is to pattern the magnetic material of the disk into bit lands such that a Direct Current (DC) magnetization (i.e., unipolar magnetization) of the entire disk may be used to create readable servo patterns via the signal contrast between the presence and absence of magnetic material.

When conventional servo patterns (e.g., servo burst patterns, sector ID patterns, cylinder ID patterns, synchronization and automatic gain control patterns, etc.) are created in this manner, many regions of nonmagnetic material have different shapes and sizes. This creates a significant challenge for planarization of the magnetic disk, which is important as it creates a reliable head-disk interface. The problem is that many of the available planarization methods have difficulty dealing with filling relatively large depressions in the disk that result from implementing the servo patterns. For example, certain planarization methods impose design rules on patterned media. For liquid-based planarization, all non magnetic grooves should be configured at or below a specified width that allows for the liquid to planarize the grooves through capillary forces. For dry planarization, such as vacuum deposit/etchback planarization, the ratio of magnetic land widths to non magnetic groove widths needs to be constant everywhere ("dry planarization design rule #1"). It is also advantageous to ensure that magnetic land and non magnetic groove widths are constant everywhere ("dry planarization design rule #2"). However, conventional servo patterns do not allow for this because of their widely varying shapes and sizes.

Additionally, with patterned media, all of the servo patterns would preferably rely on DC magnetization during fabrication of the disk to provide usable servo signals for the life of the drive. Such would have the effect of not requiring additional servo writing, thereby saving time and money during the disk manufacturing process. Some methods of planarization (e.g., vacuum deposition and liquid polymer fill), however, are sensitive to the density and width of topographic features. For example, if a process is optimized to fill non-magnetic grooves between patterned tracks in a data recording region of a DTM disk, the same process may produce unsatisfactory results on patterned servo data because the density and widths of the servo patterns can vary substantially from that of the DTM data tracks. A dip-coat/liquid spin-on process is particularly attractive from a cost and simplicity point of view; however, it often fails to fill features of servo patterns. One etch back process that may be used to avoid such limitations is chemical mechanical polishing (CMP); however, CMP is relatively expensive and difficult to implement, thereby adding to the overall cost of the produced magnetic disk. Accordingly, a need exists to create servo patterns to take advantage of the patterning of magnetic disks patterned while remaining compatible with planarization methods.

SUMMARY

Embodiments disclosed herein provide for simplified servo patterns that do not require DC magnetization of the entire disk while meeting the above-mentioned design rules to be compatible with a variety of planarization methods. For example, since the servo patterns disclosed herein do not rely on large areas of unipolar magnetization, DC magnetization of the disk is not required. Additionally, the densities and widths of features in the servo patterns are generally the same as those of the DTM tracks and thus ensure that the servo regions are as planarized as the tracks. Thus, the servo patterns allow for depressions to be planarized using a dry planarization process while providing a reliable magnetic contrast during readback. For example, liquid based planarization can then leverage capillary forces to planarize the uniform narrow features, greatly relaxing metrology and process control requirements. Planarization may be accomplished through relatively simple dipping processes similar to present lube dipping processes, filling nonmagnetic grooves with a polymeric material. Grooves up to 46 nm deep and less than 30 nm wide may be planarized to within 3 nm of the magnetic surface after dipping. Even better performance may result from shallower DTM and BPM features. Ultra violet curing after dipping may then be used to lock the material in place such that it does not evaporate or succumb to air pressure and/or other factors.

In one embodiment, a magnetic disk may be configured with a plurality of data tracks (e.g., a data region) that include lands of magnetic material and grooves of nonmagnetic material to separate the tracks. In this patterning of the magnetic disk, servo bursts may also be patterned in the magnetic disk at a plurality of locations in each track. The servo bursts are operable to direct a controller of a disk drive system to center a write head over a track and write a track ID. For example, DTM disks have patterned data tracks containing servo sectors with prepatterned fields that include a track ID, a sector ID, and a servo bursts, among other things. All patterns in both servo sectors and data sectors are constructed of alternating non magnetic grooves and magnetic lands which have the same ratio of magnetic land area to non magnetic groove area locally for all regions with patterned tracks on the disk. The non magnetic grooves and magnetic lands may be configured to have the same ratio of land width to groove width, as long as the effective lengths of grooves are the same. Servo burst fields may be patterned to be readable (i.e., generate a usable position signal) in a DC magnetized state. However, sector and track IDs are not patterned to be readable in the DC magnetized state. The sector and track IDs are instead servo written to contain such information, because patterning such would result in rule violations for dry planarization. The servo bursts are thus configured as null and phase patterns via magnetic lands and nonmagnetic grooves having uniform widths. These patterns are used by the controller to determine track eccentricity.

Additionally, the use of repetitive servo bursts in a bootstrap zone may be used to avoid the process of DC magnetizing an entire magnetic disk. For example, the magnetic disk surface may be divided into two annular regions: a data region comprising multiple data zones; and a servo bootstrap zone comprising an annular band near a crash stop. The bootstrap band may include simplified servo data, such as null patterns and phase patterns, that may be repeated consecutively. The phase patterns contain lines of magnetic lands and non magnetic grooves that are sloped relative to other lines in the pattern (e.g., either those in another part of the phase burst or relative to a "preamble"). Because the lines are sloped, they do not run continuously over long radial distances. Instead, they start on one side of the pattern and terminate on the other side of the pattern some radial distance away. This results in a pattern that is periodic in the radial direction, with a new line added every certain number of tracks. Other patterns may be configured of parallel magnetic lands and nonmagnetic grooves that are radially configured extend outward from the inner diameter in the direction of the outer diameter of the magnetic disk to yield a radial periodicity for several tracks.

In the data region, data zones may have a fixed frequency that can be chosen for each zone so that the frequency approximately scales with the mean radius of each zone, resulting in a linear density that is approximately constant across all data zones. Each data zone includes multiple concentric circular data tracks with each track being divided into multiple circumferential sectors. Each sector has a sector header which includes servo positioning information with the remainder of the sector being used for recording data. The sector headers include sequential fields, such as a synchronization or preamble field, a servo start mark, a cylinder ID (track number or "Gray code"), a sector ID, one or more servo burst patterns, and/or other fields. Many of the fields in the sector headers include regions of magnetic material and nonmagnetic grooves with about the same dimensions as those in the tracks of each data sector.

In one embodiment, the servo writing process may begin by moving a slider to a crash stop position. For example, the read head may be positioned over a bootstrap band. Then, an entire track of the bootstrap region is DC magnetized to establish a single polarization of magnetization for the track. The disk drive system may then move the slider outward from the crashstop region writing DC magnetization until the read head reaches the first track of the data region. The read head may then detect and demodulate servo burst signals to calculate a repeatable runout (RRO) trajectory. A controller of the disk drive system may apply a feedforward compensation to the actuator to follow an individual patterned track and move the slider outward one track at a time until a read head reaches the data region. For remainder of data region, the controller may then write synchronization information based on read sync fields. The controller may also write cylinder IDs and sector IDs with bipolar encoding in the ID fields, while continuing to DC magnetize sync, start mark, and burst fields, leaving the DTM tracks of the data region unmagnetized.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 2 and 3 illustrate a magnetic disk in an exemplary embodiment.

FIG. 12 is a flowchart illustrating a method for writing servo data on a magnetic disk in an exemplary embodiment.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
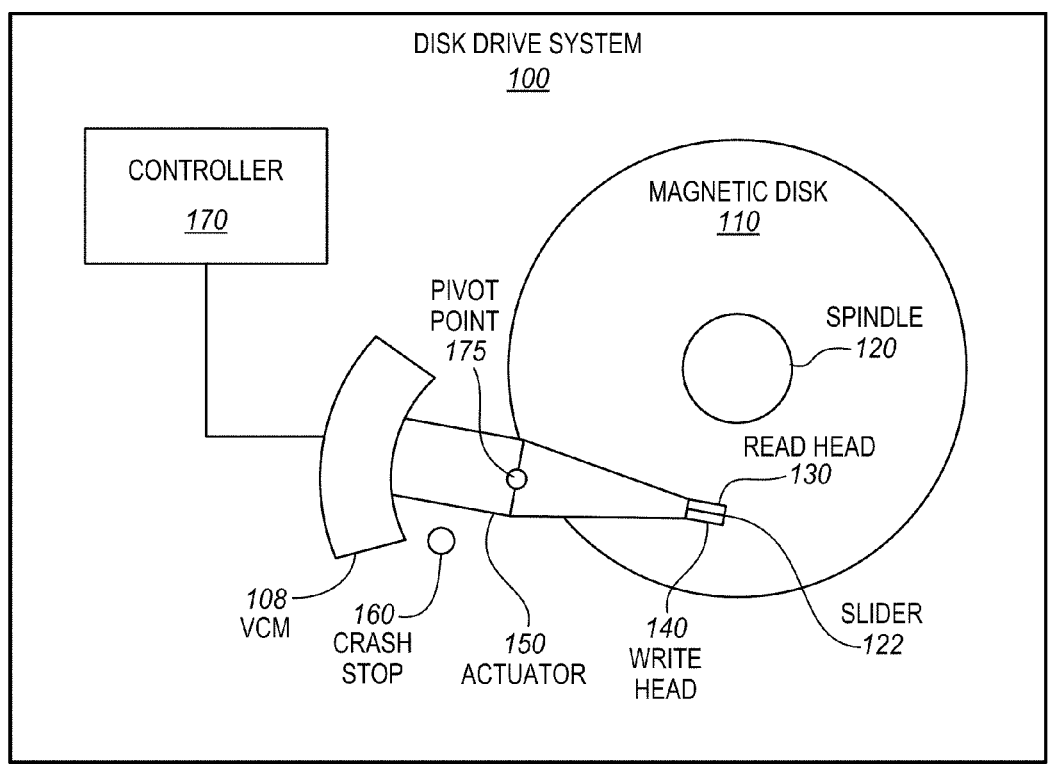
FIG. 1 illustrates a disk drive system in an exemplary embodiment.

FIG. 1 illustrates a simplified overhead view of a typical disk drive system 100, which is suitable to include a magnetic disk 110, as exemplarily described herein. In the disk drive system 100, a magnetic disk 110 is rotatably mounted upon a motorized spindle 120. A slider 122, having a read head 130 and a write head 140 fabricated thereon, is mounted upon an actuator 150 to "fly" above the surface of the rotating magnetic disk 110. In this regard, the disk drive system 100 may also include a controller 170 that is operable to apply a positional voltage to a voice coil motor (VCM) 108 to control the position of the actuator 150. The disk drive system 100 may also include an inner diameter crash stop 160 to hold the read head 130 and the write head 140 still at a fixed radius relative to the center of the magnetic disk 110. For example, the actuator 150 pivots about the pivot point 175 against the crash stop 160 to prevent the read head 130 and the write head 140 from traveling past a certain point at the inner diameter of the magnetic disk 110. The disk drive system 100 may include other components (e.g., a spindle motor used to rotate the magnetic disk 110) that are not shown for the sake of brevity. Additionally, certain components within the disk drive system 100 may be implemented as hardware, software, firmware, or various combinations thereof.

In conventional servo writing, a circular track pattern is created by pushing the actuator 150 of the disk drive system 100 against the crash stop 160 and then writing a single track pattern or a group of concentric track patterns at increasing radii. Once enough concentric tracks have been written, the read head 130 may sense previously written servo data and allow propagation of new servo tracks (e.g., both servo bursts and complete sector header information) across the surface of the magnetic disk 110. That is, the read head 130 may be positioned over a servo pattern in the track while the write head 140 is positioned over tracks that have not yet been servo written. With the advent of patterned media, servo writing is presented with new challenges. For example, track trajectory is generally not concentric with the center of rotation of the spindle 120 because it is virtually impossible to concentrically align tracks with a spindle 120. Accordingly, the actual track trajectory is sensed and duplicated during the servo writing process. To assist in this regard, simplified servo bursts, such as null patterns and phase patterns, are physically patterned in the magnetic disk 110.

Before discussing particular patterns, it should be noted that in the data region 240, data zones 250 may have a fixed data frequency that can be adjusted so that the frequency approximately scales with increasing radius and the linear density is approximately constant across all data zones 250. Each data zone includes multiple concentric circular data tracks with each track being divided into multiple circumferential sectors (i.e., the portions of the data region 240 separated by the servo sectors 320). Each sector has a sector header which includes servo positioning information with the remainder of the sector being used for recording data. The data portion of each sector includes a discrete recording area of magnetic material separated by nonmagnetic grooves. The sector headers include sequential fields, such as a synchronization or "preamble" field, a servo start mark, a cylinder ID (track number or "Gray code"), a sector ID, servo burst patterns, and/or other fields. Many of the fields in the sector headers include regions of magnetic material and nonmagnetic grooves with about the same dimensions as those in the tracks of each data sector.

In one embodiment, simplified servo data may be patterned in a relatively narrow band (e.g., 10-100 um wide) as exemplarily illustrated in FIG. 3 to utilize the advantages associated with patterned magnetic disks. For example, a bootstrap band 210 may be patterned with servo data within a crash stop compression region of the magnetic disk 110 where data is not written. Each band 210 may be configured in such a way that the servo data appears as comparably sized lands of magnetic material and comparably sized grooves of nonmagnetic material that are radially oriented. The magnetic lands of the band 210 may be immersed in a DC field to establish a magnetic contrast between the magnetic lands and nonmagnetic grooves for facilitating servo data writing in the data tracks of the servo sectors 320 of the magnetic disk 110. Alternatively, the write head 140 may be configured to DC magnetize the magnetic lands. In any case, the bootstrap servo data in the band 210 may facilitate the writing of subsequent servo data (e.g., track IDs, sector IDs, cylinder IDs, AGC, etc.) in the servo data sectors 320 by compensating for eccentricity in the magnetic disk 110 and allowing the subsequent servo data to be written on a track by track basis.

In the servo burst fields, the null patterns may be configured with a radial period of 2 tracks and two fields in quadrature, such that a unique amplitude and phase signature occurs at all radial positions with a 2 track periodicity.

The nonmagnetic grooves of the sector and the magnetic lands may be configured into sector headers such that there is a fixed servo frequency within each data zone 250 of the data region 240. For example, this "zoned" servo version may include data zones 250 with different servo frequencies, scaling roughly with the mean radius of each data zone. The servo frequency is fixed in each data zone 250, with the spatial dimensions resetting at each zone boundary to hold the spatial dimensions roughly constant. The sector headers may have discontinuities at zone boundaries. This version allows us the meet dry planarization design rule #1, since magnetic lands and non magnetic grooves scale with radius together within a zone. This version also approximately conforms to dry planarization design rule #1. Alternatively, sector headers may be circumferentially configured such that the circumferential period scales continuously with radius across all data zones 250, resulting in a single fixed servo frequency across all data zones 250. This "non zoned" servo version conforms to dry planarization design rule #1 but does not conform to dry planarization design rule #2, since both lands and grooves grow by about a factor of two in the circumferential direction when moving in radius from the inner diameter to the outer diameter of the magnetic disk 110. However, sector headers do not have discontinuities across zone boundaries. In another embodiment, the sector headers may be configured such that the absolute circumferential spatial period is constant for all data zones 250. In this "fixed wavelength" servo version, the frequency changes continuously (scaling with radius) both within sectors and across sectors moving towards the outer diameter of the magnetic disk 110. The sector headers generally have no discontinuities at zone boundaries. The fixed wavelength servo version conforms to both dry planarization design rules. Accordingly, the non zoned servo version is somewhat more difficult to planarize requiring longer deposition and longer etch back in a dry planarization process, while the zoned and fixed wavelength versions are relatively easy to planarize.

When the magnetic disk 110 is manufactured, the patterned fields for cylinder ID and sector ID generally have no recorded data to identify the individual cylinders and sectors. This information may be recorded on the magnetic disk 110, however, during the servo writing process. The burst patterns of the bootstrap band 210 may be DC magnetized or magnetized with a more complex magnetization pattern during the formatting process. The circumferential boundary features of the burst patterns are used to determine the radial position of the read head 130 relative to track centers. They are physically patterned and not created by magnetic transitions between regions of opposite magnetization generated during the formatting process. All patterns may be aligned or "registered" to the patterned servo burst, which permanently defines track centerlines to physically register the patterned tracks in the data region during the disk fabrication process.

During the formatting process, the controller 170 may direct the write head 140 to write the cylinder IDs and sector IDs, using position and synchronization information read by the read head 130. While formatting a given track, the read head 130 reads patterned features that have been previously magnetized by the write head 140 and uses the positioning and timing information derived from reading these patterns to in turn write cylinder and sector ID information on the magnetic lands.

Figure 4:
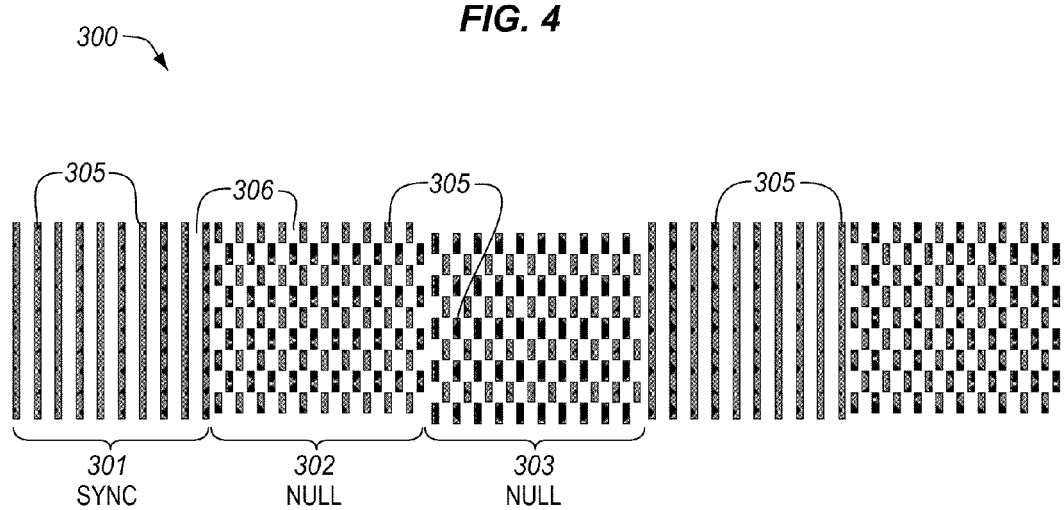
FIGS. 4 and 5 illustrate servo bursts patterned in a magnetic disk with radial magnetic grooves in exemplary embodiments.
Figure 5:
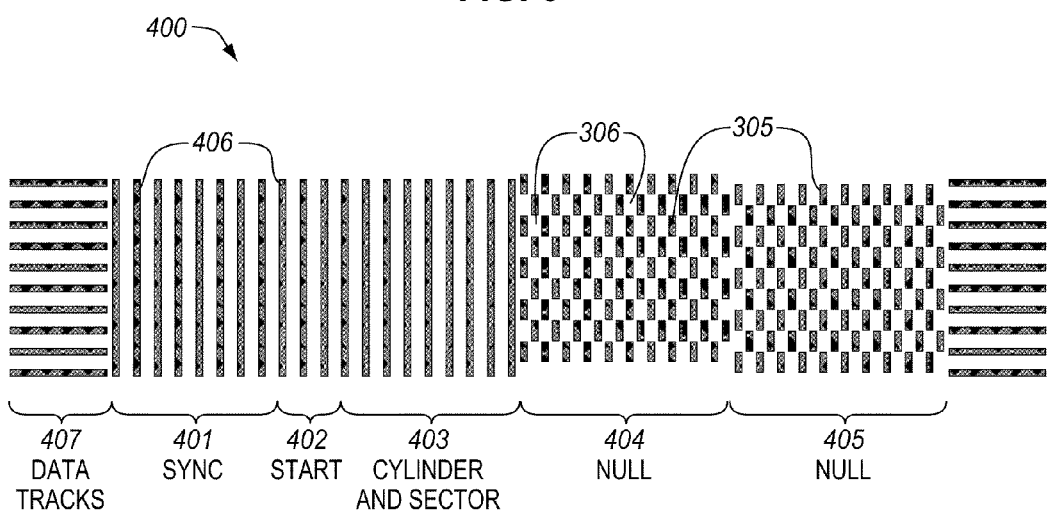

As mentioned, the data tracks of the magnetic disk 110 are not likely to be concentric with the rotation axis of the spindle 120, because the tracks are patterned lithographically in the disk fabrication process and because the magnetic disks 110 are mounted with a finite centering tolerance on the spindle 120. The patterns illustrated in FIGS. 4 and 5 may be used to measure the eccentricity and any non circularity to apply correction via the rotary actuator 150 such that the slider 122 precisely follows the patterned tracks. The servo burst 300 of FIG. 4 is configured in the bootstrap region 210 to facilitate subsequent servo writing, whereas the servo pattern 400 of FIG. 5 is configured in the data zones. The servo burst 300 includes either null patterns 302 and 303 or phase patterns, constructed of radial alternating nonmagnetic grooves 305 and magnetic lands 306. That is, the nonmagnetic grooves 305 are etched into the magnetic recording layer of the magnetic disk 110 in a parallel fashion during the disk fabrication process leaving behind magnetic lands 306 in the magnetic layer. The nonmagnetic grooves 305 may, therefore, extend outward from the center of the magnetic disk 110 in a radial fashion. In phase patterns, some of the lines of nonmagnetic grooves 305 and magnetic lands 306 are configured with a slope. Also in the case of null patterns, the lines are continually interrupted into short dashes, so there are no long radial lines in the servo burst pattern The data region 240 of the magnetic disk 110 may also be configured with a servo pattern 400 that aids in the servo writing. The servo pattern 400 is written in the data region 240 of the magnetic disk 110 and configured with sector headers that include a cylinder ID/sector ID 403 and servo start mark fields (i.e., sync 401 and start mark 402) also having radial nonmagnetic grooves 305 in the magnetic recording layer 306. This pattern is circumferentially aligned from track to track within a zone, and includes some patterns which form continuous radial spoke regions of magnetic material and nonmagnetic grooves.

Around each track, the simplified servo pattern may be repeated in the bootstrap band 210. In this example, the two null pattern regions 302 and 303 follow a sync region 301 in quadrature. The start mark may be included as well depending on the servo demodulator being used. In the data zone 240, sectors generally include a more complex sector header region (i.e., sync 401, start mark 402, cylinder ID/sector ID 403 configured after data tracks 407), as illustrated in the servo sector pattern 400. The number, lengths, and order of the fields may be configured as a matter of design choice.

The bootstrap servo burst 300 allows the controller 170 of the disk drive system 100 to measure and compensate for the eccentricity and non circularity of tracks. This can be accomplished by setting the radial position and width of the bootstrap band 210 such that the read head 130 lies within the servo burst 300 when the actuator 150 is resting against the crash stop 160. As mentioned, the crash stop 160 is elastic so the slider 122 may be positioned over a certain compression range of the crash stop 160 by applying various current levels to the actuator 150. Starting with the slider 122 compressed against the crash stop 160, a current may be applied to the write head 140 to saturate the magnetic disk 110 and write a DC magnetized pattern on one track. The slider 122 may then be moved incrementally outward to write overlapping concentric tracks of DC magnetization. Alternatively, the magnetic disk 110 may be immersed in a DC magnetic field to establish a uniform polarization. The slider 122 is generally fabricated with a measurable position offset between the read and write heads 130/140. In this regard, the read head 130 may be positioned at a slightly smaller radius than the write head 140 for all positions of the slider 122 over the magnetic disk 110. Thus, after the write head 140 has written a number of concentric DC magnetized tracks as it moves outward from the crash stop 160, the read head 130 eventually crosses into the first track that was DC magnetized by the write head.

As the read head 130 reads the servo patterns of the bootstrap band 210, the servo patterns may show constantly changing radial position relative to the track center, including a number of track crossings because the tracks are eccentric and slightly noncircular. If the servo patterns are repeated enough times around the track, and the rate of radial change due to eccentricity is sufficiently small, the individual track crossings can be identified and a precise track trajectory can be computed from the measurement.

Since the tracks are formed from a common lithographic pattern and have a common center on the magnetic disk 110, the tracks generally have a have a large synchronous repeatable runout (RRO) (i.e., runout that is the same on all tracks). There is also an asynchronous RRO. That is, a component of the runout is unique to each track, which is generally quite small and originates as nonrepeatable runout (NRRO) in the lithographic machine used to make the original pattern for the patterned tracks. RRO and NRRO generally regard eccentricity of a magnetic disk and track misregistration and are well known to those skilled in the art. Once the RRO trajectory has been computed, feed forward compensation can then be applied to the actuator 150 to follow an individual track. With the slider 122 positioned within the compression range of the crash stop 160 and with proper tracking established, the slider 122 can be stepped outward, track by track, with the write head 140 DC magnetizing additional tracks while the read head 130 reads and locks onto previously written tracks.

When the read head 130 reaches the boundary between a bootstrap band 210 and the data region 240, the read head 130 no longer reads continuous repetition of sync and servo bursts, but rather more sparsely separated sector headers separated by DTM data tracks. The writing algorithm may then be changed so that the write head 140 DC magnetizes the sync field 401, the servo start mark field 402, and the null patterns 404/405. For example, the write head 140 may use synchronization information from the read head 130 and the known read/write offset of the particular slider 122 to write these fields, leaving the DTM data tracks in their original magnetic state. A bipolar magnetization pattern may also be used for the sync, start, and servo burst fields 401-405. For example, the cylinder and sector IDs may be written by the write head 140 on a track-by-track basis as the formatting process propagates outward toward the outer diameter of the magnetic disk 110. The cylinder ID is thus the same in every sector within a track, but unique on every track, and the sector ID is unique for each sector, but common on all tracks.

It should be noted that the cylinder ID and sector ID fields 403 may be configured from the magnetic land 306 between the radial nonmagnetic grooves 305. On the magnetic land 306, one or a small number of consecutive bits of the IDs may be written in bipolar magnetic format. Unlike the sync, start, and burst fields (401, 402, 404, and 405), which rely on patterned features for magnetic signal, the patterned nonmagnetic grooves 305 in the ID fields serve no magnetic purpose. Rather, they are present for planarization purposes. For example, the nonmagnetic grooves 305 are filled during a dry planarization process to support the flying height of the slider 122. During the formatting and sector header reading, the nonmagnetic grooves 305 are therefore ignored and information is recorded in regions of positive and negative magnetization on the magnetic land 306. If the recording system has the capability for good SNR at a linear density significantly higher than the periodicity of the nonmagnetic grooves 305, multiple bits may be recorded in the areas of the magnetic land 306. It should be noted that the write clock is synchronized by reading the sync field and applying appropriate delay based on the known physical read/write offset in the slider 122. Thus, the writing of ID data during formatting is synchronized so that all recording is done on the magnetic layer 306.

In formatting the data region 240, interference between the read and write heads 130/140 (i.e., signal crosstalk) can prevent simultaneous operation. One solution includes using two revolutions per data track and writing even sectors on one revolution (i.e., while reading odd) and write the odd sectors on the second revolution (i.e., while reading even). Additionally, the actuator 150 may be directed to move the slider 122 in fractional tracks instead of integral track increments in a shingled fashion to insure coverage of all areas. From a flying height modulation perspective, radial grooves 305 with different orientations may have slightly different influence on flying height if they are not planarized or imperfectly planarized (i.e., some residual recession remains after planarization). This difference may arise from differences in air flow between the slider 122 and magnetic disk 110 in the presence of grooves of different orientations (e.g., circumferential vs. radial grooves). To compensate, the radial grooves in the sector header pattern may be made wider or narrower to intentionally change the flying height over these grooves, in order to make the flying height as uniform as possible as the slider flies over different types of patterns. The servo start mark generally requires a pattern that is clearly distinguishable from the sync pattern by the demodulator. Such patterning may include making one or more magnetic lands 306 or nonmagnetic grooves 305 of different width than the sync field. Since changing these dimensions may cause a change in the local planarization, creating either a "hill" or a "dip", a pattern that creates a dip may be used to minimize risk of head-disk contact. Isolated dips may cause some flying height modulation, but such is generally negligible if the overall start mark length is relatively short (e.g., on the order of 10 bits).

Bipolar magnetization of sync, start, ID, and/or burst fields may also be used to generate higher SNR and avoid issues of large DC magnetized areas. If bipolar magnetization is used in the burst field, the burst patterns should be designed so that any boundaries created by the write head between regions of opposite magnetization do not introduce noise or other errors in the position signal that will be derived from the patterns. An example of a pattern in which all magnetization patterns are created in the patterning process, but still compatible with bipolar magnetization, is a phase pattern, where every other land may have opposite magnetization, and the boundaries between them are patterned grooves. Another option is to write the sync, start, and ID fields with bipolar magnetization and write a servo burst field with DC magnetization to reduce the overall amount of DC magnetized fields. This may avoid the complexities of bipolar magnetization of the burst patterns.

Figure 6:
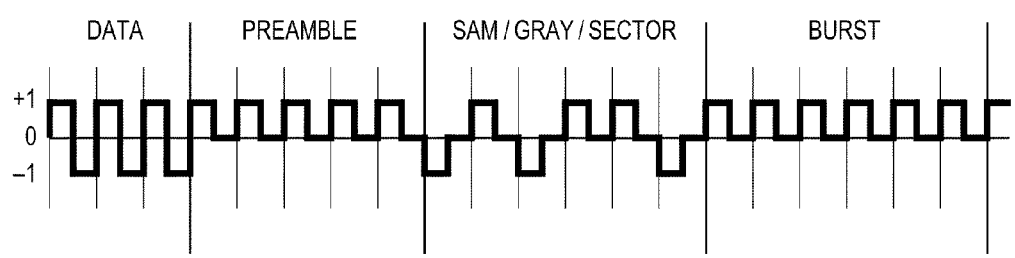
FIGS. 6 and 7 illustrate bipolar encoding schemes that may be used to record servo data in exemplary embodiments.

There are several methods that may be used to format (i.e., magnetize by writing with a head) the various fields in the sector header with bipolar magnetization. For example, the sync (or "preamble") and burst fields may be left in their DC magnetized state with only the start mark ("SAM"), cylinder ID (or "Gray code") and sector ID written in bipolar format as shown with the data preamble SAM/Gray code/sector burst of FIG. 6. For example, FIG. 6 illustrates a unipolar magnetization for preamble and burst fields and bipolar magnetization of other fields. Since a mix of unipolar and bipolar signals can be difficult for read head 130 to detect, it may be advantageous to format all of the sector headers with bipolar magnetization, resulting in a signal illustrated in FIG. 7.

In addition to providing signals that are more favorable for detection by the read head 130, bipolar formatting of the preamble may result in preamble signal frequencies that are comparable to conventional disk drive systems. For example, in a typical disk drive system having a 100 nm track pitch, the bipolar magnetization of these embodiments may result in a 100 nm wavelength in the preamble and a temporal frequency of about 127 MHz for the middle radius (e.g., a radius of 22.5 mm) of the magnetic disk 110 when spun at 5400 RPM. The bipolar magnetization doubles the period thereby lowering the preamble frequency to 63.5 MHz comparable to the preamble frequency of about 50-70 MHz in common disk drive systems.

However, bipolar formatting of the servo bursts may present certain challenges. The PES may be derived from the patterned features (i.e., the nonmagnetic grooves) in the magnetic disk 110 rather than from the magnetization boundaries written during formatting. Doing so should ensure that the servo bursts and data tracks are automatically registered with each other lithographically without requiring precise lateral positioning of the slider 122 during formatting. If the null burst patterns of FIGS. 4 and 5 are used, the magnetic lands 305 of the burst area fully interconnected, so that bipolar magnetization introduces imperfect "written in" downtrack boundaries that may affect the cross-track position signal. Accordingly, DC magnetization of the bursts, even if all other fields are bipolar, may be attractive.

Figure 8:
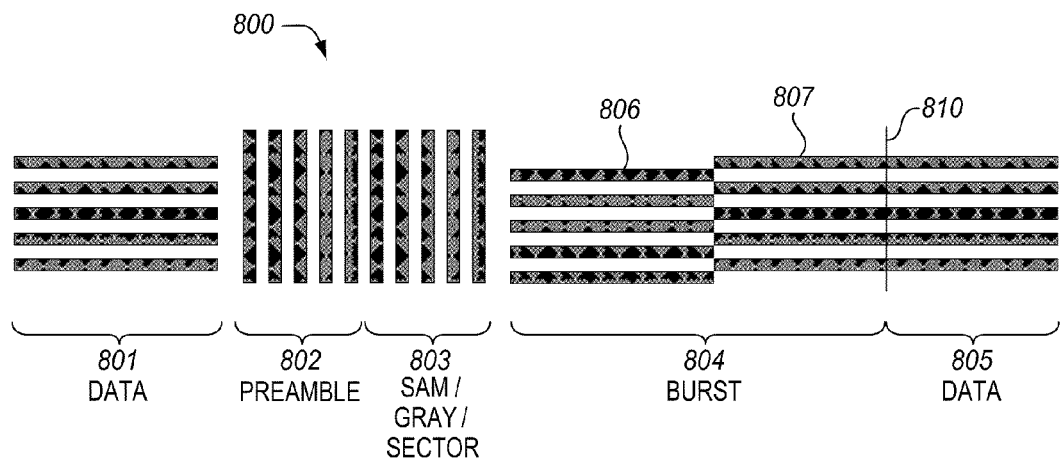
FIGS. 8 and 9 illustrate servo bursts patterned in a magnetic disk in exemplary embodiments.

Two alternative patternings of the magnetic disk 110 that may allow bipolar magnetization of the burst field without resulting in down-track magnetization boundaries on the magnetic lands are now illustrated. The first example of patterning that may be used to implement a null pattern in the data region 240 is illustrated in FIG. 8 where the pattern 800 has circumferential nonmagnetic grooves 806/807. In this embodiment, the servo bursts 804 are divided in half, with the first half having nonmagnetic grooves 806 at the track centers and the second half having nonmagnetic grooves 807 at track boundaries that are in line with nonmagnetic grooves in the data area 805. The shifted nonmagnetic grooves support the use of quadrature patterns for providing a linear PES. In effect, the second half of the burst area 804 is identical to and joined with the subsequent data area 805. A bipolar null pattern can then be written with a null pattern in the first half of the burst area 804 and in the second half of the burst area 804. Positioning of the slider 122 then may only need be able to ensure that writing does not occur beyond the nonmagnetic grooves 806/807. It should be noted, however, that the boundary 810 shown between the burst area 804 and the subsequent data area 805 may be continuous across the boundary.

Figure 9:
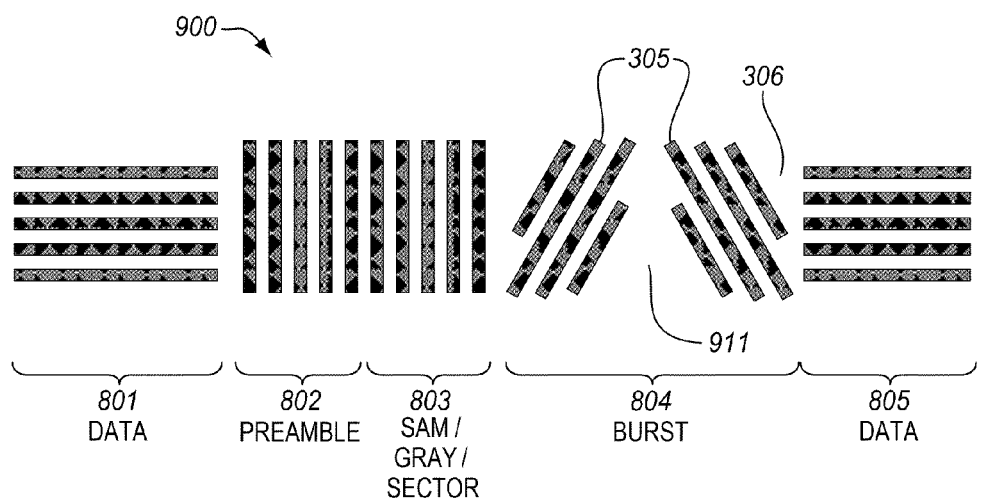

FIG. 9 illustrates another pattern 900 that may be used to implement a phase burst wherein every other land 911 of magnetic material is formatted with opposite magnetization in the data region 240. As long as the slope of the nonmagnetic grooves 910 is not too great, the skew (i.e., azimuth) of the slider 122 allows the nonmagnetic grooves 910 to separate the areas of opposite magnetization in the land 911. That is, the "ID edge" of the slider 122 does not enter the next magnetic land 911 until the outer diameter edge has also left the previous area of the magnetic land 911.

Figure 10:
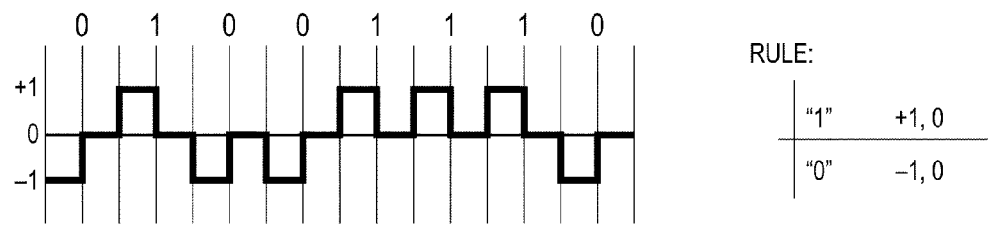
FIGS. 10 and 11 illustrate Manchester codes that may be used in bipolar encoding of a patterned magnetic disk in exemplary embodiments.

FIG. 10 shows a Manchester coding method that may be used to encode sector header data in the magnetic lands between the radial grooves in the bipolar magnetization of the data region 240, in exemplary embodiments. For example, since the nonmagnetic grooves have zero magnetization, the magnetic land 911 may be recorded with either a + or − polarization of magnetization. Each bit may be encoded as two channel bits, the first of which may be either logical −1 or +1 with the second being a logical zero (i.e., via the nonmagnetic groove 910).

In conventional drives with conventional servo patterns, the timing window for all channel bits is generally the same. In this invention, however, some of the channel bits derive from patterned features, while others are written by the head. Since the widths of grooves are chosen to satisfy planarization constraints, the time duration of a zero signal derived from a groove may not be equal to the time duration of bits recorded on the lands. The servo demodulator may need special capabilities to properly demodulate signals with these known departures from conventional practice.

Figure 7:
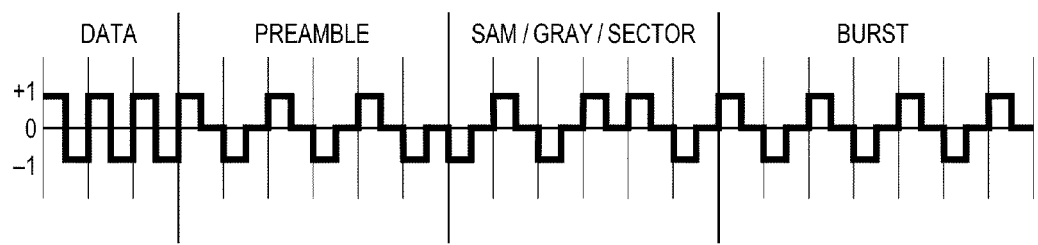
Figure 11:
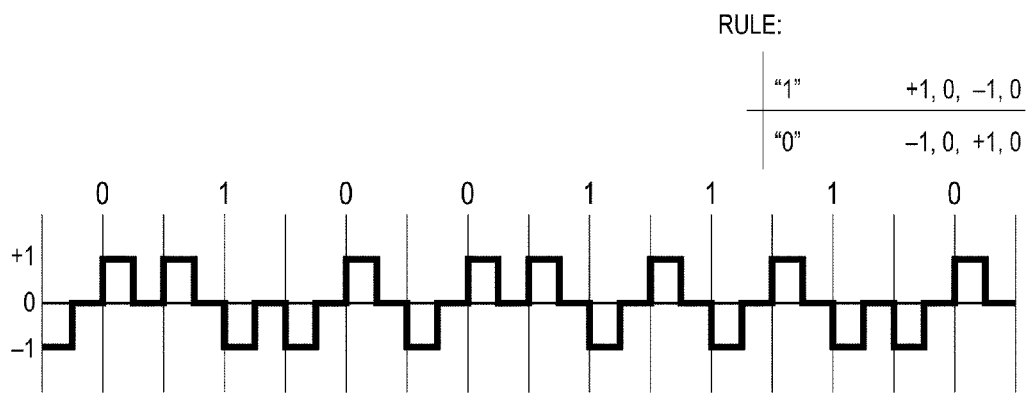

An alternative Manchester code is shown in FIG. 11 with each bit configured as 4 channel bits, the second and fourth of which are zero and the first and third of which follow traditional Manchester encoding. This code is half the data rate of the code of FIG. 9 and may be operable with a bipolar preamble as illustrated in FIG. 7. Another option may include using two or more channel bits per magnetic land with a Manchester code rule as follows:

"1"=(1, −1, 0)
"−1"=(−1, 1, 0)

This code simply adds a zero for a nonmagnetic groove after each pair of channel bits that comprise the conventional Manchester code. Such may be operable with the magnetic land widths that are ⅔ of the nonmagnetic groove pitch. However, other encoding schemes may be used in embodiments where bits recorded on the magnetic lands are separated by zeros corresponding to the nonmagnetic grooves.

FIG. 12 is a flow chart 1100 illustrating a method for writing servo information on a magnetic disk 110 in an exemplary embodiment. In this embodiment, the magnetic disk 110 is patterned with servo bursts via the configuration of magnetic lands and nonmagnetic grooves in the magnetic disk, in the process element 1110. The magnetic lands of these servo bursts may have comparable widths. The nonmagnetic grooves may also have comparable widths. While it is not necessary that the widths of the magnetic lands a nonmagnetic grooves be absolutely identical, in some instances it may be preferable to configure the widths of the magnetic lands and nonmagnetic grooves to be substantially equal to similar features of the data tracks of the magnetic disk, as described above. For example, with dry planarization, the ratio of magnetic land widths to non magnetic groove widths needs to be constant everywhere. It is also advantageous to ensure that magnetic land and non magnetic groove widths are constant everywhere.

A uniform polarity may be established with the magnetic lands of the magnetic disk, in the process element 1120, to establish the servo burst information. For example, the configuration of the magnetic lands, when configured with a uniform polarization of magnetization, may form a null pattern, providing position information for the read head with respect to a track center. Other servo information (e.g., sector ID, track ID, etc.) may be configured subsequently. With the patterning of the magnetic disk 110 completed during the disk manufacturing process, the finished disk may be installed on a spindle in the disk drive system 100. The disk 110 may then be rotated to form an air bearing between the slider 122 and the magnetic disk 110, in the process element 1130. In this regard, the disk drive system 100 may push the actuator 150 against a crashstop 160 to begin writing to data tracks of the magnetic disk. In this regard, the read head 130 may pass over the patterned servo data to determine an eccentricity of the magnetic disk 110 and compensate accordingly, in the process element 1140. The controller 170 may do so by applying a compensation current to the actuator 150 so that head follows the trajectory of an individual track, in the process element 1150. In one embodiment, the servo bursts are configured in a bootstrap region 210 that enables the controller 170 to write additional servo data in the data tracks of the magnetic disk 110. For example, these servo bursts of the bootstrap region 210 may direct the controller 170 to move outward from the crashstop 160 on a track by track basis to write track IDs and sector IDs within each track, in the process element 1160.

Although specific embodiments were described herein, the scope of the invention is not limited to those specific embodiments. The scope of the invention is defined by the following claims and any equivalents thereof.

We claim:

1. A magnetic disk, comprising:
   a data region having a plurality of tracks, wherein the tracks comprise magnetic lands having a first uniform width separated by nonmagnetic grooves having a second uniform width; and
   a plurality of patterned servo position bursts that are physically patterned in the magnetic disk at a plurality of locations in each track, wherein the patterned servo position bursts comprise magnetic lands that match the first uniform width of the tracks and nonmagnetic grooves that match the second uniform width of the tracks, wherein each of the magnetic lands utilized in forming the patterned servo position bursts share a uniform polarity of magnetization and are patterned substantially perpendicular to the tracks in the data region.

2. The magnetic disk of claim 1, wherein the patterned servo position bursts are operable to direct a controller to center a write head over a track in the data region and write a track identification in the track.

3. The magnetic disk of claim 1, wherein the patterned servo position bursts comprise a null pattern.

4. The magnetic disk of claim 1, wherein the patterned servo position bursts comprise a phase pattern.

5. The magnetic disk of claim 1, wherein a portion of the nonmagnetic grooves is configured to extend in a substantially radial direction from an inner diameter of the magnetic disk towards an outer diameter of the magnetic disk.

6. The magnetic disk of claim 1, wherein the magnetic disk is planarized with a dry planarization method.

7. The magnetic disk of claim 1, further comprising a bootstrap region circumferentially configured on the magnetic disk, wherein the bootstrap region comprises a servo position burst patterned in the magnetic disk, wherein the servo position burst of the bootstrap region is operable to direct a controller to compensate for eccentricity of the magnetic disk and to position a slider over the servo bursts of the data region.

8. The magnetic disk of claim 7, wherein the servo position burst of the bootstrap region comprises magnetic lands and nonmagnetic grooves, wherein the magnetic lands of the servo position burst of the bootstrap region comprise a uniform polarity of magnetization and wherein the servo position bursts of the bootstrap region and the data region are different.

9. The magnetic disk of claim 1, wherein a portion of the nonmagnetic grooves of the servo position burst is configured with skew relative to a radial direction.

10. A magnetic disk, comprising:
a data region having a plurality of tracks, wherein the tracks comprise magnetic lands having a first uniform width that are separated by nonmagnetic groves having a second uniform width; and
a bootstrap region circumferentially configured between the data region and a crash stop,
wherein the bootstrap region comprises a servo position burst patterned in the magnetic disk with a plurality of magnetic lands and nonmagnetic grooves, wherein the magnetic lands of the servo position burst are configured to match the first uniform width of the tracks and the nonmagnetic grooves of the servo position burst are configured to match the second uniform width of the tracks, wherein the servo position burst is operable to direct a controller to compensate for an eccentricity of the magnetic disk and position a slider over a track in the data region to center a write head over the track and write a track identification on the track, wherein each of the magnetic lands utilized in forming the servo position burst share a uniform polarity of magnetization and are patterned substantially perpendicular to the tracks in the data region.

11. The magnetic disk of claim 10, further comprising servo bursts patterned in each track of the data region, wherein the servo bursts of the data region comprise a plurality of magnetic lands and nonmagnetic grooves.

12. The magnetic disk of claim 11, wherein a portion of the nonmagnetic grooves of the servo bursts of the data region is configured to extend in a radial direction from an inner diameter of the magnetic disk towards an outer diameter of the magnetic disk.

13. The magnetic disk of claim 11, wherein a portion of the nonmagnetic grooves of the servo bursts of the data region is configured with skew relative to radial direction from an inner diameter of the magnetic disk towards an outer diameter of the magnetic disk.

14. The magnetic disk of claim 10, wherein the crash stop is configured at an inner diameter of the magnetic disk.

15. The magnetic disk of claim 11, wherein the magnetic lands of the servo bursts of the data region comprise a first uniform width and wherein the nonmagnetic grooves of the servo bursts of the data region comprise a second uniform width.

16. The magnetic disk of claim 10, wherein the servo position burst is operable to direct the controller to determine an eccentricity of the magnetic disk to establish a track-by-track propagation for writing servo data in the data region.

17. The magnetic disk of claim 10, wherein the uniform polarity of magnetization is configured from an immersion of the magnetic disk in a direct current magnetic field.

18. A magnetic disk, comprising:
a data region having a plurality of tracks, wherein the tracks comprise magnetic lands having a first uniform width separated by nonmagnetic grooves having a second uniform width; and
a plurality of patterned servo position bursts that are physically patterned in the magnetic disk at a plurality of locations in each track, wherein the patterned servo position bursts comprise magnetic lands and nonmagnetic grooves, wherein the magnetic lands and the nonmagnetic grooves are configured such that a local ratio of an area of the magnetic lands to an area of the nonmagnetic grooves is substantially uniform over all tracks and the patterned servo position bursts, wherein each of the magnetic lands utilized in forming the patterned servo position bursts share a uniform polarity of magnetization and are patterned substantially perpendicular to the tracks in the data region.

19. The magnetic disk of claim 18, wherein the magnetic lands and the nonmagnetic grooves of the patterned servo position bursts are configured such that a local ratio of widths of magnetic lands to widths of nonmagnetic grooves is substantially uniform over all tracks and patterned servo position bursts.

20. The magnetic disk of claim 18, wherein the magnetic disk is planarized with a dry planarization method and wherein the first uniform width is substantially equal to the second uniform width.

* * * * *